United States Patent [19]

Doolittle et al.

[11] 4,042,079

[45] Aug. 16, 1977

[54] VARIABLE ENERGY ABSORBER FOR AIRCRAFT ARRESTING SYSTEM

[75] Inventors: Donald B. Doolittle, Hockessin; Harry W. Deshay, Rambleton Acres, both of Del.

[73] Assignee: All American Industries, Inc., Wilmington, Del.

[21] Appl. No.: 582,214

[22] Filed: May 30, 1975

[51] Int. Cl.² .............................................. F16D 57/02
[52] U.S. Cl. ................................. 188/290; 244/110 A
[58] Field of Search ................... 188/290, 294, 296; 244/110 R, 110 A, 110 C, 110 F, 110 H; 415/129, 130

[56] References Cited

U.S. PATENT DOCUMENTS

| 843,874 | 2/1907 | Dorwald | 188/290 |
|---|---|---|---|
| 2,032,966 | 3/1936 | Yoxall | 188/290 |
| 2,077,080 | 4/1937 | Tolman | 188/290 |
| 2,383,002 | 8/1945 | Mader | 415/129 |
| 3,168,939 | 2/1965 | Haber | 188/290 |
| 3,172,625 | 3/1965 | Doolittle | 188/290 |
| 3,599,906 | 8/1971 | Reinemuth | 188/290 |
| 3,737,124 | 6/1973 | Schlegel | 188/290 |

FOREIGN PATENT DOCUMENTS

| 664,182 | 8/1929 | France | 188/290 |
|---|---|---|---|
| 527,087 | 5/1955 | Italy | 188/290 |
| 44,276 | 3/1909 | Switzerland | 188/290 |
| 999,038 | 7/1965 | United Kingdom | 415/130 |

*Primary Examiner*—Trygve M. Blix
*Assistant Examiner*—Edward R. Kazenske
*Attorney, Agent, or Firm*—Connolly and Hutz

[57] ABSTRACT

A fluid-operated energy absorber has an annular axle shaft and bearing assembly connected to the rotor shaft adjacent to a hollow compartment in the base of the rotor shaft. The annular assembly is interconnected by segmented plates. Opposite rotor vanes on each axle are disposed on different sides of the segmented plates. A pair of cam plates in the hollow shaft compartment engage cranks on the inner ends of the axle shafts for varying the angle of the vanes. The cam plates are actuated by a control rod extending out through the hollow center of the rotor shaft, which is pushed or pulled by a lead screw on the outer end of the rotor shaft to vary the angle of the vanes.

13 Claims, 8 Drawing Figures

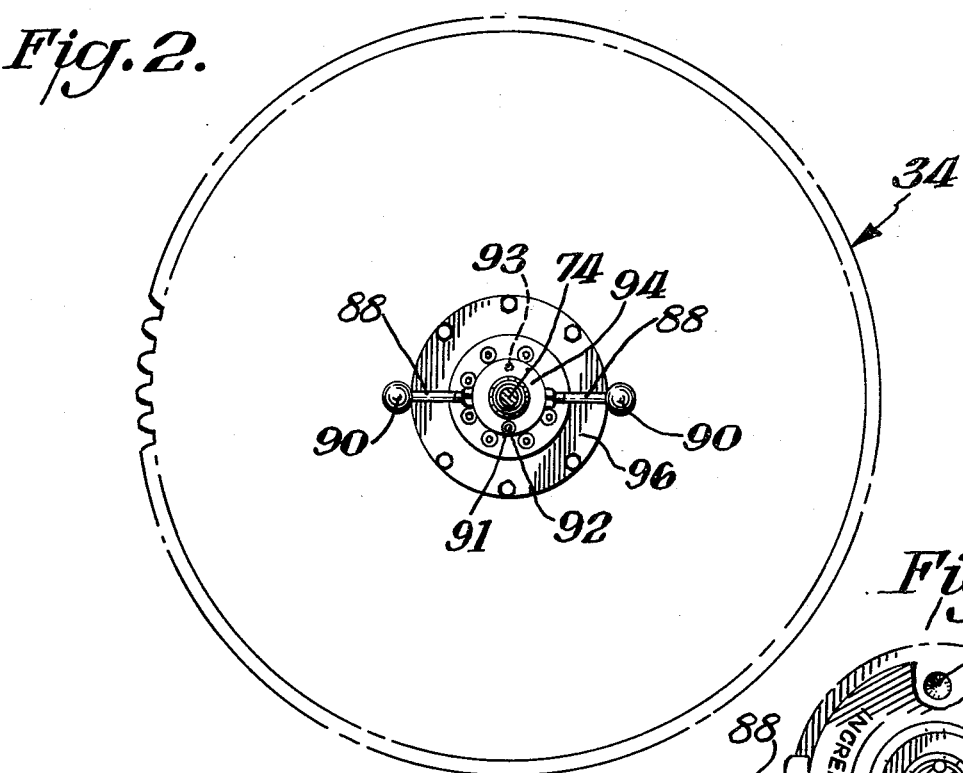
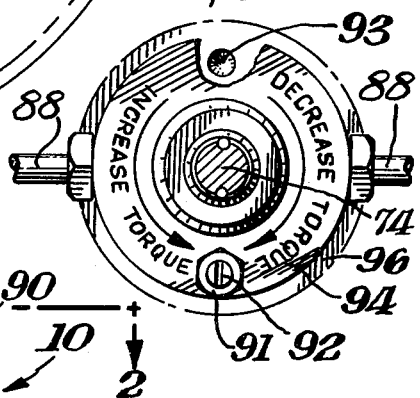
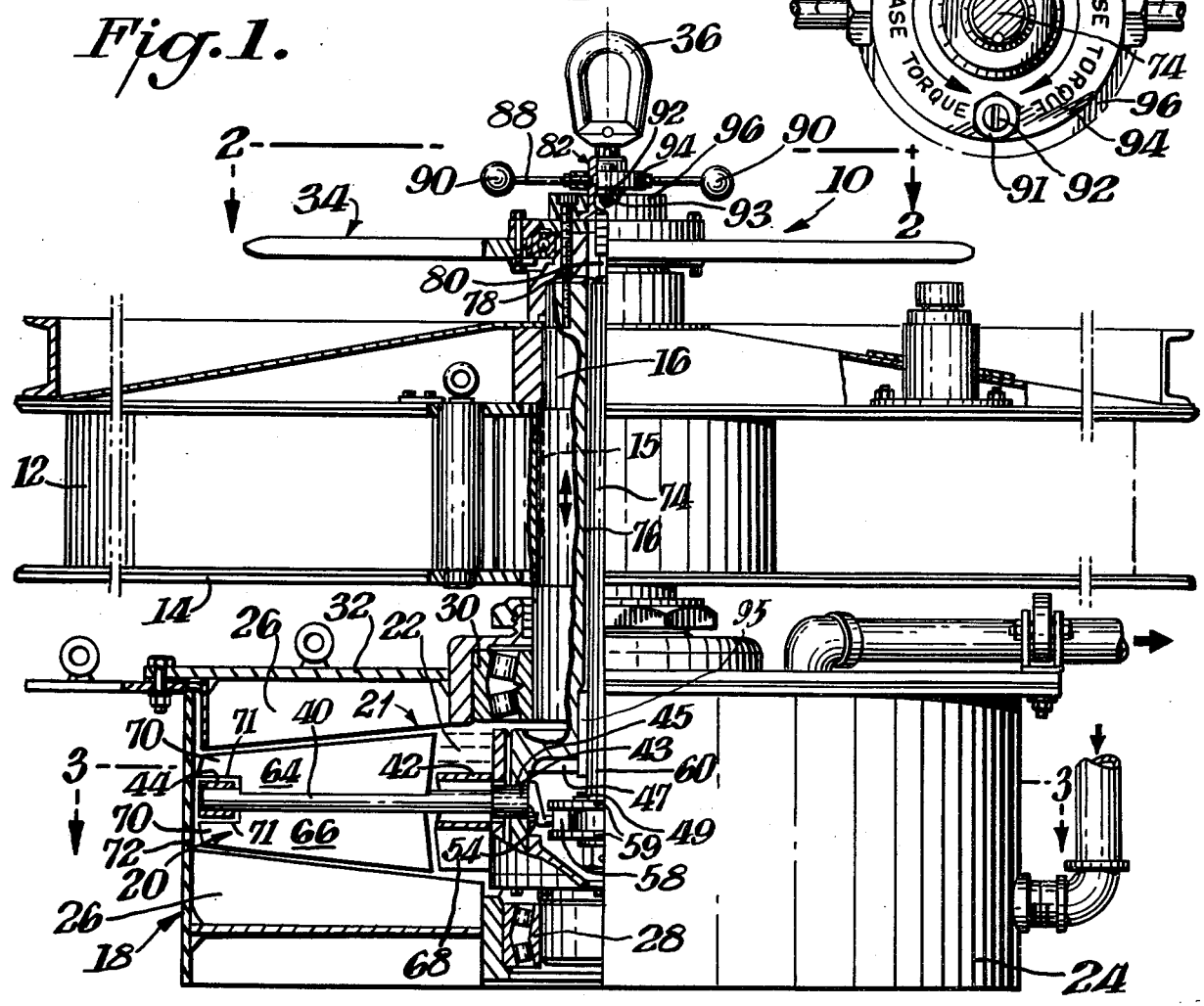

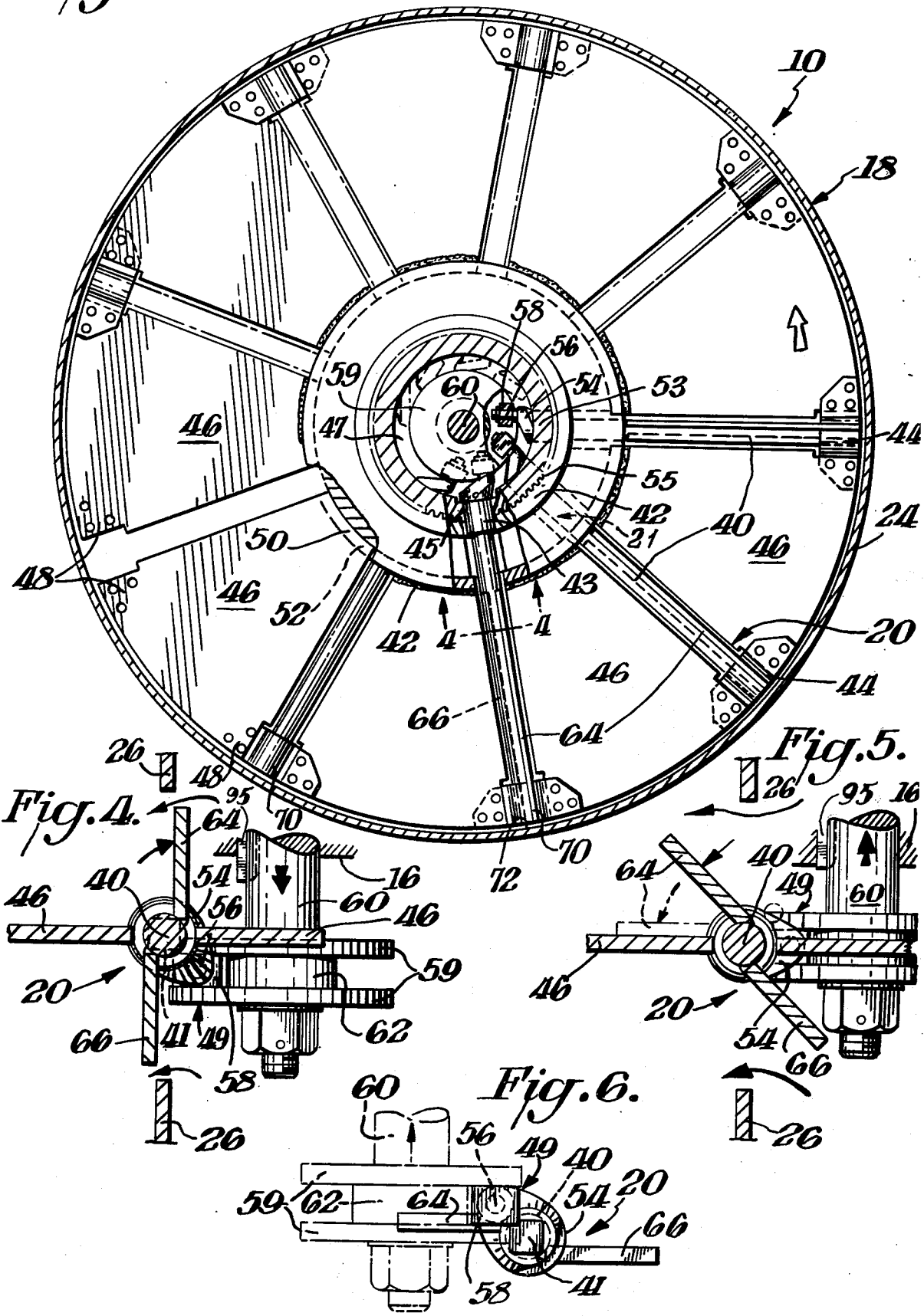

VARIABLE ENERGY ABSORBER FOR AIRCRAFT ARRESTING SYSTEM

BACKGROUND OF THE INVENTION

A highly effective energy absorber for an aircraft arresting system is described in U.S. Pat. No. 3,172,625. It incorporates a vaned rotor disposed between a pair of vaned staters in a liquid-filled casing. The arresting reaction is coarsely programmed, by the diminishing moment arm of a taped payout line wound on a drum secured to the input drive shaft of the rotor, to provide: free runout after initial contact by the aircraft, substantially constant energy absorption as the moment arm radius and mechanical advantage decrease and final smooth termination as the aircraft and energy absorber slow to rest. Such variation is not, however, as sensitive as is sometimes desired, nor does it enable the energy absorber to operate efficiently in conjunction with a wide variety of aircraft. Various devices have been proposed for varying torque in energy absorbers which vary the angle of rotating blades of vanes. Such devices are shown in U.S. Pat. No. 3,168,939 or Italian Pat. No. 527,087 (1955), but are not completely economical, rugged, strong or dependable. An object of this invention is to provide a relatively simple rugged, strong and reliable energy absorber in which the angle of the absorbing blades and the torque-developed are variable.

SUMMARY

A rotary input driving means is connected to the outer end of the rotor shaft of a rotary fluid-operated energy absorber and an annular axle and bearing assembly is connected at right angles to an inner portion of the rotor shaft. Vanes are attached to the axles. The portion of the rotor shaft disposed adjacent the annular assembly is hollow to provide a compartment within it which houses motion-transmitting means connected to the axles for rotating them to vary the angle of the vanes. The rotor shaft also has a hollow center connecting the compartment within the shaft to the outer end of the shaft. A control rod is disposed within the hollow center of the rotor shaft and connects the motion-transmitting means in the compartment to the outer end of the rotor shaft. Control motion input means is connected to the outer end of the control rod for actuating the motion-transmitting means to vary the angle of the vanes to their path of motion and accordingly varying the energy absorbed.

The annular axle and bearing assembly may be connected by segmented plates and the rotor vanes may be attached to opposite sides of the axles and be disposed parallel to each other on opposite sides of the segmented plates. Stationary vanes may be disposed on a collar around the inner ends of the axle, which are mounted on the collar around the rotor shaft for circulating fluid adjacent the rotor shaft. The outer ends of the vanes may be notched to receive the outer axle bearings. The motion-transmitting assembly may include cranks on the inner ends of the axle shaft and the motion-input means may be a lead screw and nut.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which:

FIG. 1 is a view in elevation partially in cross-section of an energy absorber which is one enbodiment of this invention;

FIG. 2 is a cross-sectional view taken through FIG. 1 along the line 2—2;

FIG. 2A is an enlarged top plan view partly broken away of a central portion of the embodiment shown in FIG. 2;

FIG. 3 is a cross-sectional view taken through FIG. 1 along the line 3—3;

FIG. 4 is a cross-sectional view taken through FIG. 3 along the line 4—4 with the vanes in a full torque-developing position;

FIG. 5 is a cross-sectional view similar to FIG. 4 with the vanes in an intermediate position;

FIG. 6 is a fragmentary view of one vane, its axle shaft and actuating cam assembly in the minimum torque position.

DESCRIPTION OF THE PREFERRED EMBODIMENT

Figure 7:
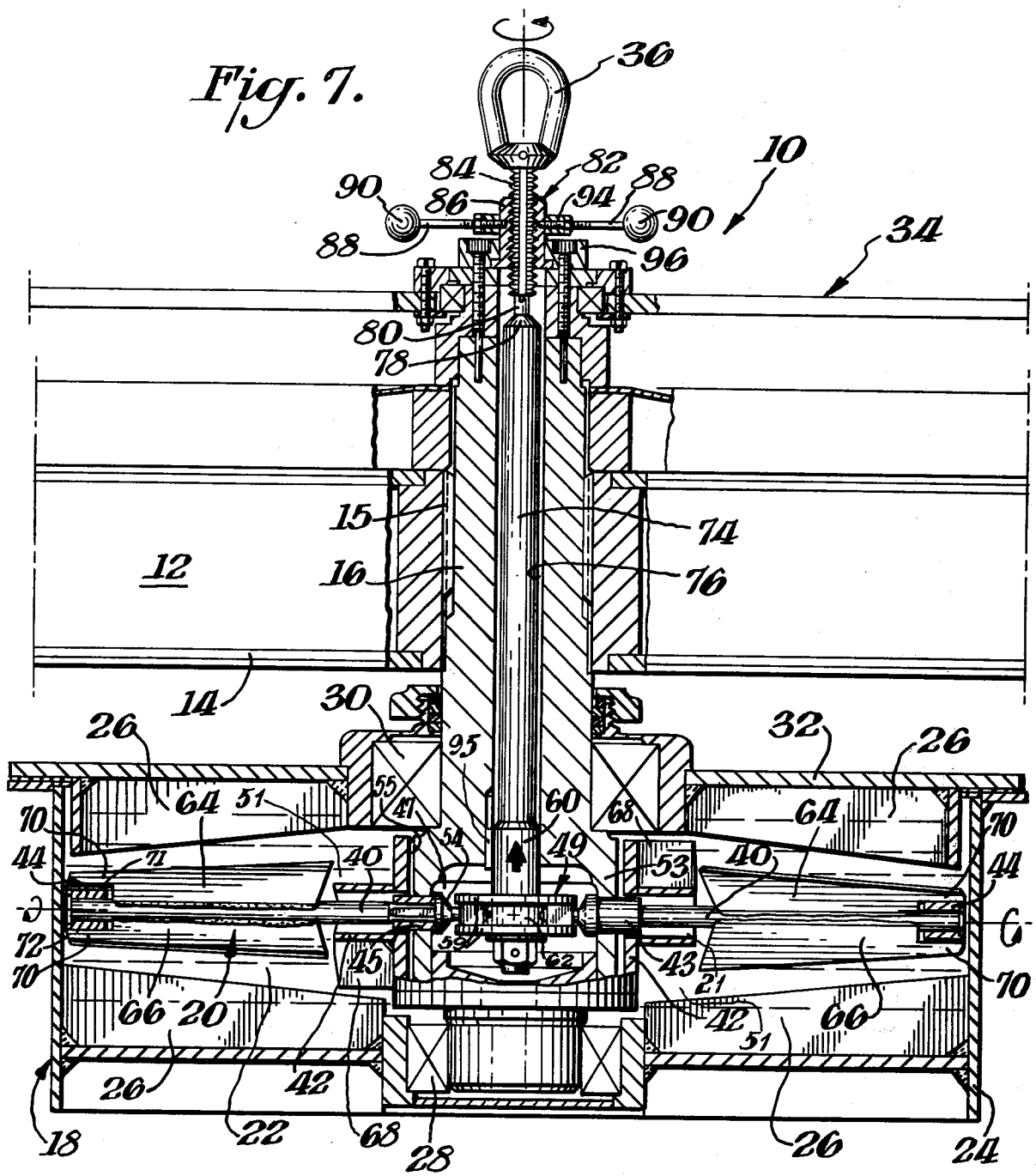
FIG. 7 is a front elevational view in cross-section of the central main portions of the embodiment shown in FIGS. 1-6.

In FIG. 1 is shown an energy absorber or brake 10 for arresting a landing aircraft by restraining the payout of the linear element 12 such as a nylon tape 12 mounted on a reel 14 connected to main rotor shaft 16, which is more clearly shown in FIG. 7. The rotation of shaft 16 is braked or retarded in fluid energy absorber 18 by the rotation of rotor vane assembly 20 within the liquid such as water 22 in casing 24 between upper and lower fixed stator blades 26. Rotor 16 is rotatably supported in lower thrust bearing 28 and journal bearing 30 in the center of casing cover 32 retrieving sprocket assembly 34 is connected near the upper end of the rotor shaft 16. In all of the respects previously mentioned, brake 10 is substantially similar to that described in U.S. Pat. No. 3,172,504. It is conveniently mounted in a pit (not shown) at the side of the aircraft runway. Lifting eye 36 is provided at the top center of brake 10.

Annular axle and bearing assembly 21, as shown in FIGS. 1, 3 and 7, includes a radial array of rotor shafts 40 mounted through a bored collar 42 and outer bearings 44. Outer bearings 44 are connected to and supported by outer corners 48 of segmented plates 46 whose inner ends 50 are inserted within a groove 52 about the midcircumference of collar 42. Inner axle bearings 45 are constituted by the perforated hub 53 of rotor shaft 16 adjacent hollow compartment 47 within shaft 16. Reel 14 is splined at 15 to the upper part of rotor 16 and bored central collar 42 is splined at 55 to hub 53 at the lower part of rotor 16 to prevent relative motion between these elements. Motion-transmitting cam and follower means 49 is mounted in compartment 47. As shown in FIGS. 3-7, bell cranks 54 are secured to the inner ends of shaft 40 and have their inner extremities 56 rotatably mounted within cam follower blocks 58 disposed between parallel cam plates 59 connected to cam actuating shaft 60 and held apart by inner spacer 62. Shaft 40 is reduced to a square cross-section 41 when it enters the bell crank hub 43 to ensure a rotation free coupling between the shaft 40 and bell crank 54.

Annular axle and bearing assembly 21 includes a pair of upper and lower parallel rotor vanes 64 and 66 connected for example by welding to the top and bottom of axle shafts 40. This permits the upward and downward movement of actuating shaft 60, shown in FIGS. 4, 5 and 6, to rotate the rotor vanes 64 and 66 from the fully opened or full torque position shown in FIG. 4 to the fully lowered or retracted position, shown in FIG. 6, through the intermediate position shown in FIG. 5. The torque can accordingly be varied from full to minimum through a number of intermediate positions.

As shown in FIG. 7, stationary vanes 68 on collar 42 alternately extending upwardly and downwardly about central collar 42, are disposed in the space 51 between the inner ends of annular assembly 21 and collar 42 to provide full torque when vanes 64 and 66 are in the annulus of liquid 22 in rotation with the rotor to minimize turbulence and cavitation perpendicular full torque position. Overhanging ends 70 of vanes 64 and 66 overlap outer bearings 44, overlapping them within notches 71, and extend adjacent the sidewalls 72 of casing 24. Collar 42 spaces the inner ends of vanes 64 and 66 radially out enough to prevent them from interfering with each other in flat fully retracted positions.

Parallel cam plates 59 are moved upwardly and downwardly by long vertical central shaft 74 mounted to slide upwardly and downwardly within central hole 76 in rotor shaft 16. Shaft 74 accordingly strongly supported both in tension and in compression.

The top end 78 of shaft 74 is connected though neck 80 to central motion-imparting assembly 82 which includes a lead screw 84 embraced within actuating nut 86 by strong threading, such as for example slightly tapered threads. Nut 86 is rotated by radiating handles 88 and knobs 90. The position of handles 88 is locked by detent 92 reacting between top hub cover 94 and lower hub plate 96. The detent is released by loosing lock nut 91, that positively retains detent screw 92 locked in detent socket 93 thereby holding control rod 74 precisely positioned.

OPERATION

The position of upper and lower rotor vanes 64 and 66 is controlled by the position of lead screw 84 within the nut 86. Actuator nut 86 actuates the vertical movement of shaft 74 thereby raising and lowering cam plates 59 as the actuator nut 86 is rotated by handles 88 with detent pin 92 released. Key 95 is, for example, inserted between a lower part of shaft 74 and rotor shaft 16. This adjusts the position of vanes 64 and 66 from full torque position shown in FIG. 4 to the retracted position shown in FIG. 7 with a wide range of intermediate positions therebetween. A wide variety of torque conditions is thereby provided for absorber 10 by an extremely rugged, durable and dependable structure.

We claim:

1. A rotary fluid-operated energy absorbing device comprising a casing for containing a fluid, a rotor shaft having an outer end disposed outside the casing and an inner portion disposed within the casing, bearing means rotatably mounting the inner portion of the rotor shaft inside the casing, a rotary input driving means connected to the outer end of the rotor shaft, a plurality of axle and bearing assemblies connected at right angles to the rotor shaft inside the casing, a pair of rotor vanes secured to each of the axles, on opposite sides thereof, the portion of the rotor shaft disposed adjacent the axle and bearing assemblies being hollow to provide a compartment within it, motion transmitting means in the compartment and being connected to the axles for rotating them to vary the angle of the vanes, the rotor shaft also having a hollow center connecting the compartment within the shaft to the outer end of the shaft, a control rod disposed within the hollow center of the rotor shaft and connecting the motion-transmitting means in the compartment to the outer end of the rotor shaft, and control motion input means connected to the outer end of the control rod whereby a control motion is imparted to the motion-transmitting means for varying the angle of the vanes to their path of motion and accordingly varying the energy absorbed, the axle and bearing assemblies comprising a radial array of axles rotatably disposed within a radial array of inner and outer bearings, the inner axle bearings are disposed in a perforated wall in the rotor shaft at the compartment within it, the plurality of axle and bearing assemblies being secured together by segmented plates and the vanes on each of the axles being disposed on opposite sides of the segmented plates, the vanes on the same axle being substantially parallel and out of line with each other whereby the vanes on each axle are always disposed on the opposite sides of the segmented plates and may lie in one orientation thereof substantially contiguous to opposite sides of the segmented plates.

2. A device as set forth in claim 1, wherein the motion-transmitting means comprises cranks disposed within the compartment and connected to the inner ends of the axles.

3. A device as set forth in claim 1, wherein the vanes have inner and outer ends, the inner ends of the vanes being disposed a short distance from the rotor shaft to provide an annular space therebetween, and stationary vanes being attached to the rotor shaft in the annular space for circulating the liquid adjacent the rotor shaft.

4. A device as set forth in claim 3, wherein a collar is attached to the rotor shaft adjacent the space and the stationary vanes are attached to the collar.

5. A device as set forth in claim 1, wherein the motion-transmitting means comprises a cam and following means.

6. A device as set forth in claim 5, wherein the cam and follower means comprises a pair of spaced plates connected to the control rod and cranks connected to the inner ends of the axles.

7. A device as set forth in claim 6, wherein bearing blocks are disposed between the cam plates, and the inner ends of the cranks are rotatably received within the blocks.

8. A device as set forth in claim 1, wherein the control motion input means comprises a lead screw and nut.

9. A device as set forth in claim 8, wherein a locking means reacts between the lead screw and nut to hold it in a set position.

10. A device as set forth in claim 1, wherein the outer ends of the vanes are disposed adjacent the casing, the outer ends have axial notches, and the outer axle bearings are received within the axial notches.

11. A device as set forth in claim 1, wherein the vanes have inner and outer ends, the inner ends of the vanes being disposed a short distance from the rotor shaft to provide an annular space therebetween, and stationary vanes being attached to the rotor shaft in the annular space circulating the liquid adjacent the rotor shaft, a perforated collar is attached to the rotor shaft adjacent the space, the stationary vanes being disposed in alternate directions, and the inner ends of the segmented plates being attached to the collar.

12. A device as set forth in claim 11, wherein a stator vane assembly is disposed in the casing axially adjacent the rotor vanes.

13. A device as set forth in claim 12, wherein two of the stator vane assemblies are provided, one of the stator vane assemblis is disposed above the rotor vanes and the other of the stator vane assemblies is disposed below the rotor vanes.

* * * * *